3,439,000
ALDEHYDES AND KETONES OF TRIFLUOROMETHYLFURANS

Kenneth K. Wyckoff, Ronald E. Bambury, and David M. Tennent, Ashland, Ohio, assignors to Richardson-Merrell Inc., New York, N.Y., a corporation of Delaware
No Drawing. Continuation-in-part of application Ser. No. 482,907, Aug. 26, 1965. This application Oct. 6, 1965, Ser. No. 493,535
Int. Cl. C07d 5/26, 5/22; A61l 13/00
U.S. Cl. 260—347.5       13 Claims This application is a continuation-in-part of our copending United States patent application Ser. No. 482,907, filed on Aug. 26, 1965, now U.S. Patent 3,405,163.

This invention relates to novel aldehyde and ketone derivatives of trifluoromethylfurans. More particularly, this invention relates to compounds of the formula

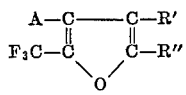

Formula I wherein A is either hydrogen or an ester group of the formula

wherein R is alkyl, aryl, cycloalkyl or aralkyl and (a) in the case of aldehydes, either R' or R" is formyl and the remaining R' or R" is hydrogen or aryl, whereas (b) in the case of ketones, either R' or R" is alkylcarbonyl and the remaining R' or R" is hydrogen or aryl.

The aldehydes of this invention when A of Formula I is an ester group can be represented by the following Formula II:

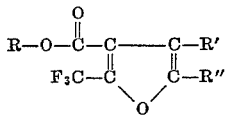

Formula II wherein R is lower alkyl, aryl, cycloalkyl or aralkyl; either R' or R" is formyl

and the remaining R' or R" is either hydrogen or a carbocyclic aryl. Illustrative of suitable groups as can be represented by R, there can be mentioned: lower alkyl, i.e., alkyl having from 1 to 6 carbon atoms, and preferably alkyl having from 1 to 3 carbon atoms, e.g., methyl, ethyl, propyl, isopropyl, n-butyl, isobutyl, etc.; carbocyclic aryls having 6 to 10 carbon atoms, i.e., phenyl or naphthyl; carbocyclic aralkyls of phenyl or naphthyl having from 7 to 14 carbon atoms, e.g., benzyl, phenylethyl, phenylpropyl, α-naphthylmethyl, β-naphthylethyl, etc.; and cycloaliphatics having from 3 to 6 carbon atoms such as cyclopropyl, cyclobutyl, cyclohexyl, etc. The R' or R" which is not formyl can be hydrogen, phenyl or naphthyl and preferably hydrogen, particularly when R" is formyl and R is lower alkyl. Illustrative of aldehydes of the above Formula II there can be mentioned:
4-carbomethoxy-5-trifluoromethyl-2-furfural;
4-carbethoxy-5-trifluoromethyl-2-furfural;
isopropyl-5-formyl-2-trifluoromethyl-3-furoate;
phenyl 5-formyl-2-trifluoromethyl-3-furoate;
cyclohexyl 5-formyl-2-trifluoromethyl-3-furoate;
benzyl 5-formyl-2-trifluoromethyl-3-furoate;
4-carbethoxy-5-trifluoromethyl-3-furfural;
n-amyl 4-formyl-2-trifluoromethyl-3-furoate;
phenyl 4-formyl-2-trifluoromethyl-3-furoate;
benzyl 4-formyl-2-trifluoromethyl-3-furoate;
cyclohexyl 4-formyl-2-trifluoromethyl-3-furoate;
4-carbethoxy-3-phenyl-5-trifluoromethyl-2-furfural;
4-carbethoxy-3-(α-naphthyl)-5-trifluoromethyl-2-furfural;
4-carbethoxy-2-phenyl-5-trifluoromethylfurfural;
phenyl 5-formyl-4-phenyl-2-trifluoromethyl-3-furoate; and the like.

The ketones of this invention when A of Formula I is an ester group can be represented by the following Formula III:

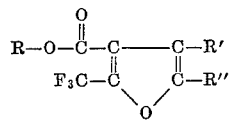

Formula III wherein: R represents the same groups recited for R in the Formula II aldehydes; one of R' or R" is alkylcarbonyl of the formula

wherein Z is alkyl of 1 to 5 carbon atoms, and the remaining R' or R" is hydrogen, phenyl or naphthyl. Preferably R is lower alkyl, R' is hydrogen and R" is alkylcarbonyl. Illustrative of ketones of the above Formula III there can be mentioned:
ethyl 5-acetyl-2-trifluoromethyl-3-furoate;
butyl 5-acetyl-2-trifluoromethyl-3-furoate;
isopropyl 5-acetyl-2-trifluoromethyl-3-furoate;
phenyl 5-acetyl-2-trifluoromethyl-3-furoate;
cyclohexyl 5-acetyl-2-trifluoromethyl-3-furoate;
benzyl 5-acetyl-2-trifluoromethyl-3-furoate;
ethyl 5-propionyl-2-trifluoromethyl-3-furoate;
ethyl 4-acetyl-2-trifluoromethyl-3-furoate;
phenyl 4-acetyl-2-trifluoromethyl-3-furoate;
cyclohexyl 4-acetyl-2-trifluoromethyl-3-furoate;
benzyl 4-acetyl-2-trifluoromethyl-3-furoate;
ethyl 4-propionyl-2-trifluoromethyl-3-furoate;
ethyl 5-acetyl-4-phenyl-2-trifluoromethyl-3-furoate;
ethyl 4-acetyl-5-phenyl-2-trifluoromethyl-3-furoate;
ethyl 5-acetyl-4-(α-naphthyl)-2-trifluoromethyl-3-furoate; and the like.

The aldehydes of this invention when A of Formula I is hydrogen can be represented by the following Formula IV:

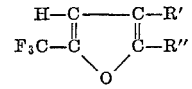

Formula IV wherein: R' and R" represent the same R' and R" groups described in the Formula II aldehydes. Illustrative of aldehydes of the above Formula IV, there can be mentioned:
5-trifluoromethyl-2-furfural;
5-trifluoromethyl-3-phenyl-2-furfural;
5-trifluoromethyl-3-furfural;
5-trifluoromethyl-2-phenyl-3-furfural; and
5-trifluoromethyl-3-(α-naphthyl)-2-furfural.

The ketones of this invention when A of Formula I is hydrogen can be represented by the following Formula V:

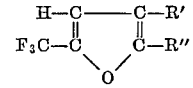

Formula V wherein: one of R' and R" is alkylcarbonyl of the formula

wherein Z is alkyl of 1 to 5 carbon atoms and preferably 1 to 2 carbon atoms and the remaining R′ or R″ is hydrogen, phenyl or naphthyl. Illustrative of ketones of the above Formula V, there can be mentioned: 2-acetyl-5-trifluoromethylfuran; 2-propionyl-5-trifluoromethylfuran; 2 - acetyl - 3 - phenyl - 5 -trifluoromethylfuran; 2 acetyl-3 - (α - naphthyl) - 5 - trifluoromethylfuran; 3 - acetyl-5 - trifluomethylfuran; 3 - propionyl - 5 - trifluoromethylfuran; 3 - acetyl - 2 - phenyl - 5 - trifluoromethylfuran; and the like.

The aldehydes and ketones of this invention can be prepared by conventional techniques for the preparation of aldehydes and ketones from aromatic compounds having a lower alkyl group substituted with one or two halogen atoms on the carbon atom of the alkyl adjacent to the aromatic ring. Many such techniques generally involve dehydrohalogenation together with or followed by hydrolysis. The halogenated furan reactants employed in preparing the aldehydes and ketones of this invention are describe in our copending application Ser. No. 493,534, filed concurrently herewith.

One method for preparing the aldehydes and ketones is by the reaction of a monohalogenated furan reactant with an alkali metal salt of a nitroalkane to prepare an intermediate which is then hydrolyzed. This, as well as the other methods disclosed herein for the preparation of aldehydes and ketones, is applicable whether A of Formula I is an ester group or hydrogen and whether the compound to be produced is a ketone or an aldehyde. This reaction can be shown as follows:

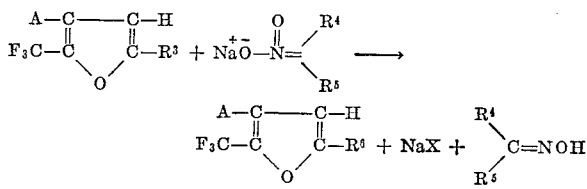

wherein A is hydrogen or an ester group

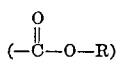

as described in the Formula II compounds; $R^3$ is the group

each X is a halogen having an atomic number greater than 9, i.e., chlorine, bromine or iodine, and G is hydrogen or alkyl of 1 to 5 carbon atoms, $R^4$ is hydrogen or alkyl of about 1 to 3 carbon atoms;

$R^5$ is alkyl of 1 to 3 carbon atoms; and $R^6$ is the group

wherein G is hydrogen or alkyl of 1 to 5 carbon atoms. In the above equation, the hydrogen shown on the furan rings can be aryl as described in Formula II. Also, the furan reactant can have the positions for $R^3$ and hydrogen (or aryl) interchanged with each other and the resulting compounds would have the hydrogen (or aryl) and resulting carbonyl group in the interchanged positions. A preferred method for effecting the above reaction is as follows:

To the sodium salt of a nitroalkane (2-nitropropane, nitrobutane, nitroethane, etc.) suspended in an alcohol (ethanol, propanol, butanol, etc.) is added an equal molar quantity of the monohalogenated furan compound. The mixture is allowed to react within the range of 0° C. to reflux temperature until the pH drops to near neutrality. The alcohol is removed by evaporation at reduced pressure, water is added to the residue, and the residue partitioned between water and a solvent (ether, benzene, chloroform, etc.). The organic phase is washed with aqueous base (2–5% sodium or potassium hydroxide or 10% sodium carbonate, etc.). After drying of the organic phase by a suitable reagent (sodium sulfate, magnesium sulfate, molecular sieves, etc.), the product is isolated by fractional distillation of the mixture. The product may also be isolated at this point by converting it to a solid addition complex such as a bisulfite complex, purifying the complex and finally regenerating the aldehyde from the complex.

A method which can be employed to prepare the aldehydes and ketones from dihalogenated furans is illustrated below.

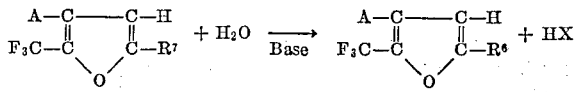

wherein A is hydrogen or an ester group as described for the Formula II compounds; $R^7$ is the group

wherein each X is a halogen having an atomic number greater than 9, G is hydrogen or alkyl of 1 to 5 carbon atoms; and $R^6$ is the group

whreein G is hydrogen or alkyl of 1 to 5 carbon atoms. In the above equation the hydrogen shown on the furan rings can be phenyl or naphthyl or $R^7$, and of course the resulting $R^6$ can be in the position shown for hydrogen on the furan rings, in which case the position shown for $R^7$ and the resulting $R^6$ in the above equation would be substituted with hydrogen, phenyl or naphthyl. A preferred method for effecting the above reaction is as follows:

A mixture of a dihalogenated furan, e.g., 5-trifluoromethyl-2-dibromomethylfuran, water and a base (calcium carbonate, barium hydroxide, calcium oxide) is heated with stirring until the hydrolysis is complete (1 to 10 hours). This may be ascertained by any one of several analytical techniques such as vapor phase chromatography, thin layer chromatography, or by a test for presence of active organic halide, etc. The aldehyde formed in the hydrolysis is then separated from the aqueous phase by extraction with an organic solvent or by steam distillation. Purification of the aldehyde may be accomplished by distillation, vapor phase chromatography, column chromatography, conversion to a complex, etc.

Still another method for preparing the aldehydes and ketones of this invention is by the Sommelet reaction which consists of refluxing a solution of the haloalkyl reactant with hexamethylenetetramine in aqueous alcohol, or if the reactants are mixed in a non-aqueous solvent, they combine to form a quaternary ammonium salt which is decomposed by water. This latter technique can be shown as follows:

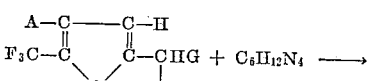

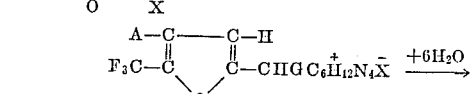

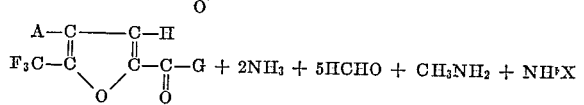

wherein X is a halogen having an atomic number greater than 9; A is hydrogen or an ester group as described for the Formula II compounds; and G is hydrogen or alkyl of 1 to 5 carbon atoms. In the above equation, (a) the hydrogen shown on the furan ring can be phenyl or naphthyl, or (b) the positions of the hydrogen (or the aryl) shown on the furan rings and that of the

and the resulting

can be interchanged so that the hydrogen (or aryl) is on the carbon atom adjacent to the heterocyclic oxygen. A preferred method for effecting this reaction is as follows:

The trifluoromethyl-halomethylfuran is treated with a molar equivalent amount of hexamethylenetetramine in an inert solvent (carbon tetrachloride, chloroform, benzene, etc.). The mixture is refluxed for about 2 hours and the salt which is formed is then isolated and hydrolyzed in an aqueous medium (50% acetic acid or 60% ethanol preferred). Refluxing the mixture for one to two hours is usually sufficient to complete the hydrolysis. The aldehyde or ketone is then isolated by standard procedures (extraction, steam distillation, complex formation, etc.).

The preparation of the halogenated trifluoromethylfurans which are used as reactants for the preparation of the aldehydes and ketones of this invention is described in our copending U.S. patent application Ser. No. 493,534, filed concurrently herewith. Briefly, in a preferred process, they can be prepared by allylic halogenation by refluxing N-bromosuccinimide with a solution of carbon tetrachloride and the corresponding trifluoromethylfuran having a lower alkyl group in place of one of the R′ or R″ groups of the Formula I compounds, whereas the remaining R′ or R″ is hydrogen or aryl of from 6 to 10 carbon atoms. Optionally, an activator such as dibenzoyl peroxide is added to improve the bromination; also illumination of the refluxing mixture with an ultraviolet source speeds up the reaction. Equal molar quantities of the brominating agent and trifluoromethylfuran reactant are generally employed in preparing monobrominated derivatives, whereas two molar equivalents of the brominating agent are generally employed per mole equivalent of the trifluoromethylfuran reactant in preparing the dibrominated derivatives. This reaction can be depicted as follows for the preparation of monobrominated derivatives having a bromine atom on an alkyl group attached to the furan ring carbon atom adjacent to the heterocyclic oxygen and wherein R′ of Formula I is hydrogen.

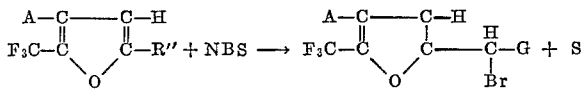

wherein A is hydrogen or an ester group as described in Formula II, R″ is lower alkyl, NBS is N-bromosuccinimide, S is succinimide and G is hydrogen or alkyl of 1 to 5 carbon atoms. The hydrogen shown on the furan ring in the above equation can also be phenyl or naphthyl; also the position on the furan ring reactant of the hydrogen (or phenyl or naphthyl) with that of R″ and the resulting

can be interchanged so that the reactants and resulting products have the hydrogen, phenyl or naphthyl on the furan ring carbon atom adjacent to the heterocyclic oxygen.

A generic formula for the halogenated trifluoromethylfurans used to prepare the aldehydes and ketones of this invention can be represented as follows:

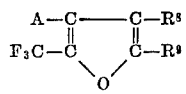

Formula B wherein A is hydrogen or an ester group $$-\overset{O}{\underset{\|}{C}}-O-R$$

wherein R has the same meaning as R in the Formula II esters; either R⁸ or R⁹ is a halogenated alkyl of the formula

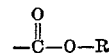

wherein each X is halogen having an atomic number greater than 9 and G is hydrogen or alkyl of 1 to 5 carbon atoms; and the remaining R⁸ or R⁹ is hydrogen, phenyl or naphthyl.

The trifluoromethylfuran reactants for preparing the halogenated derivatives, wherein the compounds have an ester group, i.e., A in the above Formula B is an ester, can be prepared by the cyclization, at a temperature of about 95° C., of a trifluoromethyl dione in contact with a catalytically effective quantity of an acid, e.g., sulfuric acid. This process together with the resulting compounds is more fully described in our copending patent application Ser. No. 493,534, filed concurrently herewith. The process can be illustrated as follows:

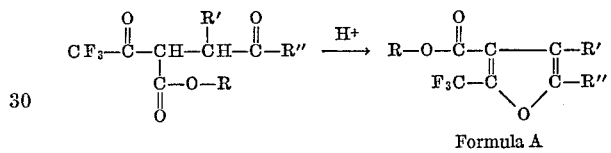

Formula A wherein R is lower alkyl, cycloalkyl or aryl as described in the Formula II compounds; one of R′ and R″ is lower alkyl; and the remaining R′ or R″ is hydrogen, phenyl or naphthyl. The preparation of the dione reactant is described in our copending United States patent application Ser. No. 482,907, filed on Aug. 26, 1965. Briefly, the diones are prepared by reacting an alkali metal enolate salt of certain trifluoroketo compounds with an α-haloketone in the presence of a catalytically effective quantity of an alkali metal iodide. The reaction can be illustrated as follows:

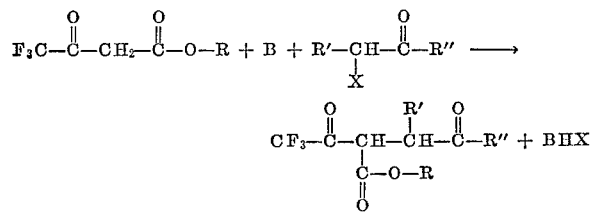

wherein each of R, R′ and R″ have the same meaning as in the above Formula A, X is a halogen such as bromine, and B is a strong alkali metal base, e.g., sodium ethoxide.

The halogenated trifluoromethylfurans used as reactants for the preparation of the aldehydes and ketones of this invention are also derived from the esters of Formula A. The esters are first hydrolyzed to the corresponding acid. The hydrolysis is effected by preparing an alkali metal salt, e.g., with sodium hydroxide, of the ester of Formula A and then converting the salt to the free furoic acid by contact with a mineral acid, e.g., hydrochloric acid. The acid is then thermally decarboxylated by heating at a temperature in the range of about 150° C. to 300° C., preferably in the presence of high boiling solvents such as quinoline together with a decarboxylation catalyst, e.g., copper oxide. The decarboxylated trifluoromethylfuran is then halogenated in the same manner as that of the Formula A esters to produce the halogenated trifluoromethylfuran compounds used as reactants for the preparation of the Formula I compounds of this invention having hydrogen for the group A. These halogenated trifluoromethylfuran reactants can be represented by the formula:

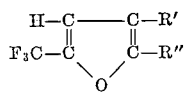

wherein one of R' and R'' is a mono- or dihalogenated group of the formula

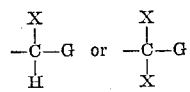

wherein each X is a halogen having an atomic number greater than 9 and G is hydrogen or alkyl of 1 to 5 carbon atoms and whereas the remaining R' or R'' is hydrogen, phenyl or naphthyl.

The aldehydes and ketones of this invention can be employed as the active antibacterial constituent of disinfectant compositions for the control of microorganisms such as: Bacillus subtilis; Pseudomonas aeruginosa; Salmonella typhimurium; Escherichia coli; Proteus mirabilis; Erysipelothrix insidiosa; Staphylococcus aureus; Streptococcus agalactiae; and the like. For such use, the halogenated derivatives can be dispersed in water or oil with or without a wetting, dispersing or emulsifying agent in concentrations which can vary over a wide range such as that of about 0.01% to 1% by weight of the water or oil to prepare germicidal solutions, suspensions or emulsions which can be used, e.g., by spraying, to inhibit the growth of microorganisms. Also, they can be used in such concentrations as preservatives, e.g., in fuels and oils. For example, the aldehyde, 5-trifluoromethyl-2-furfural; inhibited the growth of the above named organisms in a soy broth medium at a concentration of 0.01%.

The aldehydes and ketones of this invention can be condensed with various hydrazines, hydrazides and hydroxylamines by methods well known in the art to prepare antibacterial agents and growth promoting agents for veterinary animals. A typical method for preparing the hydrazine or hydrazide derivatives can be illustrated by the preparation of a semicarbazone of an aldehyde or ketone of this invention. Illustratively, to a solution of one molar equivalent of semicarbazide hydrochloride and one molar equivalent of sodium acetate dissolved in water, is added one molar equivalent of an aldehyde or ketone of this invention, e.g., 5-trifluoromethyl-2-furfural. The mixture is shaken vigorously for 10 to 15 minutes at room or elevated temperature and the resulting semicarbazone, e.g., 5-trifluoromethyl-2-furfural semicarbazone, forms as a precipitate. In place of the semicarbazide hydrochloride, other hydrazine or hydrazide reactants can be condensed with aldehydes or ketones of this invention. Illustratively, hydroxylamine hydrochloride can be used to produce the corresponding thiosemicarbazone. The hydrazine, hydrazide and hydroxylamine derivatives of the aldehydes and ketones of this invention have antiprotazoal action. As described hereinbefore the novel aldehydes and ketones have antibacterial action. As growth stimulants for veterinary animals, e.g., poultry and swine, the hydrazine, hydrazide and hydroxylamine derivatives of the novel aldehydes and ketones of this invention provide a growth improvement and enhanced feed efficiency through the administration of feedstuff containing a small quantity of such derivatives. For such use the hydrazine, hydrazide and hydroxylamine derivatives of the aldehydes and ketones of this invention can be employed over a wide range of concentrations such as that of about 0.1 to 1000 grams thereof per ton of animal feed.

The trifluoromethyl group adds stability to the aldehydes and ketones of this invention. Thus, the heterocyclic ring is not subject to general attack and degradation, as is generally found with the furan ring, e.g., under acid conditions.

The following examples are illustrative of the invention:

Example 1.—Preparation of ethyl 5-acetyl-2-trifluoromethyl-3-furoate

A solution of sodium ethylate is prepared from 3.0 grams (g.) (0.1 g. atom) of sodium and 125 milliliters (ml.) of absolute ethanol. 2-nitro-propane, 11.5 g. (0.13 mole), and 31.5 g. (0.1 mole) of ethyl 5-(1-bromoethyl)-2-trifluoromethyl-3-furoate are added and the mixture is stirred at room temperature for 20 hours. After removing the solvent in vacuo, 100 ml. water is added to the residue and the mixture is extracted with ether. The organic extracts are washed with 18% sodium carbonate solution then with water and dried over anhydrous magnesium sulfate. After filtration, the filtrate is concentrated in vacuo and the residue is purified by vapor phase chromatography (column) to give ethyl 5 - acetyl-2-trifluoromethyl-3-furoate.

Example 2.—Preparation of phenyl 5-formyl-2-trifluoromethyl-3-furoate

A solution of sodium ethylate is prepared from 3.0 grams (g.) (0.1 g. atom) of sodium and 125 milliliters (ml.) of absolute ethanol. 2-nitro-propane, 11.5 g. (0.13 mole), and 34.9 g. (0.1 mole) of phenyl 5-bromomethyl-2-trifluoromethyl-3-furoate are added and the mixture is stirred at room temperature for 20 hours. After removing the solvent in vacuo, 100 ml. water is added to the residue and the mixture is extracted with ether. The organic extracts are washed with 18% sodium carbonate solution then with water and dried over anhydrous magnesium sulfate. After filtration, th filtrate is concentrated in vacuo and the residue is purified by vapor phase chromatography (column) to give phenyl 5 - formyl - 2 - trifluoromethyl-3-furoate.

Example 3.—Preparation of 4-carbethoxy-3-phenyl-5-trifluoromethylfurfural

A solution of sodium ethylate is prepared from 3.0 grams (g.) (0.1 g. atom) of sodium and 125 milliliters (ml.) of absolute ethanol. 2-nitro-propane, 11.5 g. (0.13 mole), and 37.7 g. (0.1 mole) of ethyl 5-bromomethyl-4-phenyl-2-trifluoromethyl-3-furoate are added and the mixture is stirred at room temperature for 20 hours. After removing the solvent in vacuo, 100 ml. water is added to the residue and the mixture is extracted with ether. The organic extracts are washed with 18% sodium carbonate solution then with water and dried over anhydrous magnesium sulfate. After filtration, the filtrate is concentrated in vacuo and the residue is purified by vapor phase chromatography (column) to give 4-carbethoxy-3-phenyl-5-trifluoromethylfurfural.

Example 4.—Preparation of 4-carbethoxy-5-trifluoromethyl-3-furfural

A solution of sodium ethylate is prepared from 3.0 grams (g.) (0.1 g. atom) of sodium and 125 milliliters (ml.) of absolute ethanol. 2-nitro-propane, 11.5 g. (0.13 mole), and 30.1 g. (0.1 mole) of ethyl 4-bromomethyl-2-trifluoromethyl-3-furoate are added and the mixture is stirred at room temperature for 20 hours. After removing the solvent in vacuo, 100 ml. water is added to the residue and the mixture is extracted with ether. The organic extracts are washed with 18% sodium carbonate solution then with water and dried over anhydrous magnesium sulfate. After filtration, the filtrate is concentrated in vacuo and the residue is purified by vapor phase chromatography (column) to give 4 - carbethoxy - 5 - trifluoromethyl-3-furfural.

Example 5.—Preparation of 4-carbethoxy-2-phenyl-5-trifluoromethyl-3-furfural

A solution of sodium ethylate is prepared from 3.0 grams (g.) (0.1 g. atom) of sodium and 125 milliliters (ml.) of absolute ethanol. 2-nitro-propane, 11.5 g. (0.13 mole), and 37.7 g. (0.1 mole) of ethyl 4-bromomethyl-5-phenyl-2-trifluoromethyl-3-furoate are added and the mixture is stirred at room temperature for 20 hours. After removing the solvent in vacuo, 100 ml. water is added to the residue and the mixture is extracted with ether. The organic extracts are washed with 18% sodium carbonate solution then with water and dried over anhydrous magnesium sulfate. After filtration, th filtrate is concentrated in vacuo and the residue is purified by vapor phase chromatography (column) to give 4-carbethoxy-2-phenyl-5-trifluoromethyl-3-furfural.

Example 6.—Preparation of ethyl 4-acetyl-2-trifluoromethyl-3-furoate

A solution of sodium ethylate is prepared from 3.0 grams (g.) (0.1 g. atom) of sodium and 125 milliliters (ml.) of absolute ethanol. 2-nitro-propane, 11.5 g. (0.13 mole), and 31.5 g. (0.1 mole) of ethyl 4-(1-bromoethyl)-2-trifluoromethyl-3-furoate are added and the mixture is stirred at room temperature for 20 hours. After removing the solvent in vacuo, 100 ml. water is added to the residue and the mixture is extracted with ether. The organic extracts are washed with 18% sodium carbonate solution then with water and dried over anhydrous magnesium sulfate. After filtration, the filtrate is concentrated in vacuo and the residue is purified by vapor phase chromatography (column) to give ethyl 4-acetyl-2-trifluoromethyl-3-furoate.

Example 7.—Preparation of 2-acetyl-5-trifluoromethylfuran

A solution of sodium ethylate is prepared from 3.0 grams (g.) (0.1 g. atom) of sodium and 125 milliliters (ml.) of absolute ethanol. 2-nitro-propane, 11.5 g. (0.13 mole), and 24.3 g. (0.1 mole) of 2-(bromoethyl)-5-trifluoromethylfuran are added and the mixture is stirred at room temperature for 20 hours. After removing the solvent in vacuo, 100 ml. water is added to the residue and the mixture is extracted with ether. The organic extracts are washed with 18% sodium carbonate solution then with water and dried over anhydrous magnesium sulfate. After filtration, the filtrate is concentrated in vacuo and the residue is purified by vapor phase chromatography (column) to give 2-acetyl-5-trifluoromethylfuran.

Example 8.—Preparation of 3-phenyl-5-trifluoromethylfurfural

A solution of sodium ethylate is prepared from 3.0 grams (g.) (0.1 g. atom) of sodium and 125 milliliters (ml.) of absolute ethanol. 2-nitro-propane, 11.5 g. (0.13 mole), and 30.5 (0.1 mole) of 2-bromomethyl-3-phenyl-5-trifluoromethylfuran are added and the mixture is stirred at room temperature for 20 hours. After removing the solvent in vacuo, 100 ml. water is added to the residue and the mixture is extracted with ether. The organic extracts are washed with 18% sodium carbonate solution then with water and dried over anhydrous magnesium sulfate. After filtration, the filtrate is concentrated in vacuo and the residue is purified by vapor phase chromatography (column) to give 3-phenyl - 5 - trifluoromethylfurfural.

Example 9.—Preparation of 5-trifluoromethyl-3-furfural

A solution of sodium ethylate is prepared from 3.0 grams (g.) (0.1 g. atom) of sodium and 125 milliliters (ml.) of absolute ethanol. 2-nitro-propane, 11.5 g. (0.13 mole), and 22.9 g. (0.1 mole) of 3-bromomethyl-5-trifluoromethylfuran are added and the mixture is stirred at room temperature for 20 hours. After removing the solvent in vacuo, 100 ml. water is added to the residue and the mixture is extracted with ether. The organic extracts are washed with 18% sodium carbonate solution then with water and dried over anhydrous magnesium sulfate. After filtration, the filtrate is concentrated in vacuo and the residue is purified by vapor phase chromatography (column) to give 5-trifluoromethyl-3-furfural.

Example 10.—Preparation of 2-phenyl-5-trifluoromethyl-3-furfural

A solution of sodium ethylate is prepared from 3.0 grams (g.) (0.1 g. atom) of sodium and 125 milliliters (ml.) of absolute ethanol. 2-nitro-propane, 11.5 g. (0.13 mole), and 30.5 g. (0.1 mole) of 3-bromomethyl-2-phenyl-5-trifluoromethylfuran are added and the mixture is stirred at room temperature for 20 hours. After removing the solvent in vacuo, 100 ml. water is added to the residue and the mixture is extracted with ether. The organic extracts are washed with 18% sodium carbonate solution then with water and dried over anhydrous magnesium sulfate. After filtration, the filtrate is concentrated in vacuo and the residue is purified by vapor phase chromatography (column) to give 2-phenyl-5-trifluoromethyl-3-furfural.

Example 11.—Preparation of ethyl-5-acetyl-2-trifluoromethyl-3-furoate

A stirred mixture of 10 g. (0.1 mole) of calcium carbonate, 39.4 g. (0.1 mole) of ethyl 5-(1,1-dibromoethyl)-2-trifluoromethyl-3-furoate and 250 ml. of water is heated under reflux temperature for 16 hours. The cooled mixture is extracted three times with 150-ml. portions of ether and the combined extracts are dried over anhydrous magnesium sulfate. After filtration, the solvent is removed at reduced pressure and the residue is purified by vapor phase chromatography (column) to give ethyl 5-acetyl-2-trifluoromethyl-3-furoate.

Example 12.—Preparation of phenyl-5-formyl-2-trifluoromethyl-3-furoate

A stirred mixture of 10 g. (0.1 mole) of calcium carbonate, 42.8 g. (0.1 mole) of phenyl 5-dibromomethyl-2-trifluoromethyl-3-furoate and 250 ml. of water is heated under reflux temperature for 16 hours. The cooled mixture is extracted three times with 150-ml. portions of ether and the combined extracts are dried over anhydrous magnesium sulfate. After filtration, the solvent is removed at reduced pressure and the residue is purified by vapor phase chromatography (column) to give phenyl 5-formyl-2-trifluoromethyl-3-furoate.

Example 13.—Preparation of 4-carbethoxy-3-phenyl-5-trifluoromethylfurfural

A stirred mixture of 10 g. (0.1 mole) of calcium carbonate, 45.6 g. (0.1 mole) of ethyl 5-dibromomethyl-4-phenyl-2-trifluoromethyl-3-furoate and 250 ml. of water is heated under reflux temperature for 16 hours. The cooled mixture is extracted three times with 150-ml. portions of ether and the combined extracts are dried over anhydrous magnesium sulfate. After filtration, the solvent is removed at reduced pressure and the residue is purified by vapor phase chromatography (column) to give 4-carbethoxy-3-phenyl-5-trifluoromethylfurfural.

Example 14.—Preparation of 4-carbethoxy-5-trifluoromethyl-3-furfural

A stirred mixture of 10 g. (0.1 mole) of calcium carbonate, 38.0 g. (0.1 mole) of ethyl 4-dibromomethyl-2-trifluoromethyl-3-furoate and 250 ml. of water is heated under reflux temperature for 16 hours. The cooled mixture is extracted three times with 150-ml. portions of ether and the combined extracts are dried over anhydrous magnesium sulfate. After filtration, the solvent is removed at reduced pressure and the residue is purified by vapor phase chromatography (column) to give 4-carbethoxy-5-trifluoromethyl-3-furfural.

Example 15.—Preparation of 4-carbethoxy-2-phenyl-5-trifluoromethyl-3-furfural A stirred mixture of 10 g. (0.1 mole) of calcium carbonate, 45.6 g. (0.1 mole) of ethyl 4-dibromomethyl-5-phenyl-2-trifluoromethyl-3-furoate and 250 ml. of water is heated under reflux temperature for 16 hours. The cooled mixture is extracted three times with 150-ml. portions of ether and the combined extracts are dried over anhydrous magnesium sulfate. After filtration, the solvent is removed at reduced pressure and the residue is purified by vapor phase chromatography (column) to give 4-carbethoxy-2-phenyl-5-trifluoromethyl-3-furfural.

Example 16.—Preparation of ethyl 4-acetyl-2-trifluoromethyl-3-furoate

A stirred mixture of 10 g. (0.1 mole) of calcium carbonate, 39.4 g. (0.1 mole) of ethyl 4-dibromomethyl-2-trifluoromethyl-3-furoate and 250 ml. of water is heated under reflux temperature for 16 hours. The cooled mixture is extracted three times with 150-ml. portions of ether and the combined extracts are dried over anhydrous magnesium sulfate. After filtration, the solvent is removed at reduced pressure and the residue is purified by vapor phase chromatography (column) to give ethyl 4-acetyl-2-trifluoromethyl-3-furoate.

Example 17.—Preparation of 2-acetyl-5-trifluoromethylfuran

A stirred mixture of 10 g. (0.1 mole) of calcium carbonate, 32.2 g. of 2-(1-,1-dibromomethyl)-5-trifluoromethylfuran and 250 ml. of water is heated under reflux temperature for 16 hours. The cooled mixture is extracted three times with 150-ml. portions of ether and the combined extracts are dried over anhydrous magnesium sulfate. After filtration, the solvent is removed at reduced pressure and the residue is purified by vapor phase chromatography (column) to give 2-acetyl-5-trifluoromethylfuran.

Example 18.—Preparation of 3-phenyl-5-trifluoromethylfurfural

A stirred mixture of 10 g. (0.1 mole) of calcium carbonate, 38.4 g. (0.1 mole) of 2-dibromomethyl-3-phenyl-5-trifluoromethylfuran and 250 ml. of water is heated under reflux temperature for 16 hours. The cooled mixture is extracted three times with 150-ml. portions of ether and the combined extracts are dried over anhydrous magnesium sulfate. After filtration, the solvent is removed at reduced pressure and the residue is purified by vapor phase chromatography (column) to give 3-phenyl-5-trifluoromethylfurfural.

Example 19.—Preparation of 5-trifluoromethyl-3-furfural

A stirred mixture of 10 g. (0.1 mole) of calcium carbonate, 30.8 g. (0.1 mole) of 3-dibromomethyl-5-trifluoromethylfuran and 250 ml. of water is heated under reflux temperature for 16 hours. The cooled mixture is extracted three times with 150-ml. portions of ether and the combined extracts are dried over anhydrous magnesium sulfate. After filtration, the solvent is removed at reduced pressure and the residue is purified by vapor phase chromatography (column) to give 5-trifluoromethyl-3-furfural.

Example 20.—Preparation of 2-phenyl-5-trifluoromethyl-3-furfural

A stirred mixture of 10 g. (0.1 mole) of calcium carbonate, 38.4 g. (0.1 mole) of 3-dibromomethyl-2-phenyl-5-trifluoromethylfuran and 250 ml. of water is heated under reflux temperature for 16 hours. The cooled mixture is extracted three times with 150-ml. portions of ether and the combined extracts are dried over anhydrous magnesium sulfate. After filtration, the solvent is removed at reduced pressure and the residue is purified by vapor phase chromatography (column) to give 2-phenyl-5-trifluoromethyl-3-furfural.

Example 21.—Preparation of 4-carbethoxy-5-trifluoromethyl-2-furfural

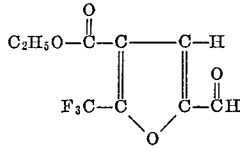

A mixture of 20.0 g. of 5-dibromomethyl-3-carbethoxy-5-trifluoromethylfuran, 150 ml. water and 20.0 g. calcium carbonate was heated under reflux, with stirring, for 6.0 hours. The mixture was cooled and then extracted with ether. After drying the ether extract over magnesium sulfate, and removing the drying agent by filtration, the filtrate was evaporated at reduced pressure to give 6.7 g. (53% yield of 4 - carbethoxy - 5 - trifluoromethyl - 2 - furfural.

Example 22.—Preparation of 5-trifluoromethyl-2-furfural

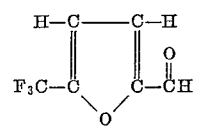

A mixture of 22.9 g. of 5-trifluoromethyl-2-bromomethylfuran, 14.0 g. of hexamethylenetetramine and 150 ml. of chloroform was stirred for a few hours and the hexamethylenetetraminium salt which formed was collected by filtration, 34.7 g. (94% yield). The dried salt (22.0 g.) was then disolved in 40 ml. of 50% acetic acid and the solution was refluxed for three hours. To the mixture was added 10 ml. of concentrated hydrochloric acid and the acidified solution was poured over ice water. The mixture was extracted three times with ether and the ether extracts combined and dried over anhydrous magnesium sulfate. Evaporation of the extract gave the crude 5-trifluoromethyl-2-furfural which was converted to the semicarbazone by the usual procedure, wt. 2.2 g. (17% yield) M.P. 208–210°. This type of aldehyde synthesis may also be carried out without isolation of the hexamethylene tetramine salt (see Org. Syn., vol. 8, pp. 197–217).

Example 23.—Preparation of 5-trifluoromethyl-2-furfural

To 5.3 g. of sodium in 300 ml. absolute alcohol was added 30 g. of 2-nitropropane. To the resulting solution was added, with stirring 55.3 g. of 2-bromomethyl-5-trifluoromethylfuran. After stirring the mixture for 3 hours at a temperature of 70° the solvent was removed by evaporation at reduced pressure. Water was added to the residue and the mixture extracted with ether. The ether phase was washed 2 times with 150-ml. portions of 5% aqueous sodium hydroxide and then with water. The ether plase was dried over magnesium sulfate and then the ether was removed by distillation. Vacuum distillation (40 mm.) of the residue gave 18.8 g., B.P. 68–70°.

*Analysis.*—Cal. for $C_6H_3F_3O_2$: C, 43.8; H, 1.84; F, 34.8. Found: C, 43.4; H, 1.84; F, 34.6.

Example 24.—Preparation of ethyl 2-formyl-5-trifluoromethyl-4-furoate

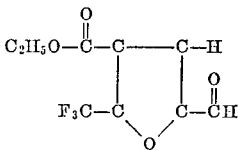

To 1.55 g. sodium dissolved in 65 ml. absolute ethanol was added 7.55 g. of 2-nitropropane. Next, was added 20 g. of ethyl 5-bromomethyl-2-trifluoromethyl-3-furoate and the mixture was stirred at room temperature for 20 hours. The ethanol was removed by evaporation at reduced pressure and water was added to the residue. The resulting mixture was extracted with ether. The ether phase was washed with 10% sodium carbonate and then water. The ether phase was dried over magnesium sulfate and then evaporated. The residual oil was distilled under reduced pressure (0.4 mm.) to give 11 g. of ethyl 2-formyl-5-trifluoromethyl-4-furoate boiling at 75–85°.

*Analysis.*—Cal. for $C_9H_7F_3O_4$: C, 45.8; H, 2.99; F, 24.1. Found: C, 45.7; H, 3.04; F, 24.0.

The vapor phase chromatography colunms employed in the examples are 5% SE–30 (a resin sold by the General Electric Company) on Gas-Chrom Z (a firebrick support sold by Applied Science Laboratories, Inc.) and 5% of diethylene glycol succinate on Gas-Chrom Z.

What is claimed is:

1. A compound of the formula $$\begin{array}{c} H-C\text{———}C-R' \\ \| \quad \quad \| \\ F_3C-C \quad \quad C-R'' \\ \diagdown O \diagup \end{array}$$

wherein: one of R' and R'' is formyl and the remaining R' or R'' is a member selected from the group consisting of hydrogen, phenyl and naphthyl.

2. 5-trifluoromethyl-2-furfural.
3. 5-trifluoromethyl-3-phenyl-2-furfural.
4. A compound of the formula $$\begin{array}{c} O \\ \| \\ R-O-C-C\text{———}C-R' \\ \| \quad \quad \| \\ F_3C-C \quad \quad C-R'' \\ \diagdown O \diagup \end{array}$$

wherein R is a member selected from the group consisting of lower alkyl, cycloalkyl having from 3 to 6 carbon atoms, phenyl, naphthyl, phenylalkyl having 7 to 14 carbon atoms and naphthylalkyl having from 11 to 14 carbon atoms; one of R' and R'' is formyl and the remaining R' or R'' is a member selected from the group consisting of hydrogen, phenyl and naphthyl.

5. A compound of claim 4 wherein R is lower alkyl, R' is hydorgen and R'' is formyl.
6. 4-carbethoxy-5-trifluoromethyl-2-furfural.
7. Phenyl 5-formyl-2-trifluoromethyl-3-furoate.
8. 4 - carbethoxy-3-phenyl-5-trifluoromethyl-2-furfural.
9. A compound of the formula $$\begin{array}{c} H-C\text{———}C-R' \\ \| \quad \quad \| \\ F_3C-C \quad \quad C-R'' \\ \diagdown O \diagup \end{array}$$

wherein one of R' and R'' is alkylcarbonyl of the formula $$\begin{array}{c} O \\ \| \\ -C-Z \end{array}$$

wherein Z is alkyl of 1 to 5 carbon atoms and the remaining R' or R'' is a member selected from the group consisting of hydrogen, phenyl and naphthyl.

10. 2-acetyl-5-trifluoromethylfuran.
11. A compound of the formula $$\begin{array}{c} O \\ \| \\ R-O-C-C\text{———}C-R' \\ \| \quad \quad \| \\ F_3C-C \quad \quad C-R'' \\ \diagdown O \diagup \end{array}$$

wherein R is a member selected from the group consisting of lower alkyl, cycloalkyl having from 3 to 6 carbon atoms, phenyl, naphthyl, phenylalkyl having from 7 to 14 carbon atoms and naphthlyalkyl having from 11 to 14 carbon atoms; one of R' and R'' is alkylcarbonyl of the formula $$\begin{array}{c} O \\ \| \\ -C-Z \end{array}$$

wherein Z is alkyl of 1 to 5 carbon atoms and the remaining R' or R'' is a member selected from the group consisting of hydrogen and carbocyclic aryl of 6 to 10 carbon atoms.

12. A compound of claim 11 wherein R is lower alkyl, R'' is the group $$\begin{array}{c} O \\ \| \\ -C-Z \end{array}$$

and R' is hydrogen.

13. Ethyl-5-acetyl-2-trifluoromethyl-3-furoate.

References Cited

UNITED STATES PATENTS

| | | | |
|---|---|---|---|
| 2,436,532 | 2/1948 | Singleton | 260—347.3 |
| 2,744,917 | 5/1956 | Jones et al. | 260—347.5 |

OTHER REFERENCES

Wertheim: Textbook of Organic Chemistry, pages 763 to 764 (1945), second edition. QD251. W48.

Yale: Jour. Med. Pharm. Chem., volume 1, No. 2, pages 121 to 131 (1959), RS1J5.

ALEX MAZEL, *Primary Examiner.*

B. I. DENTZ, *Assistant Examiner.*

U.S. Cl. X.R.

260—347.8; 424—285.